United States Patent
Cox et al.

(10) Patent No.: US 11,435,444 B2
(45) Date of Patent: Sep. 6, 2022

(54) MITIGATING INTERFERENCE FOR LIDAR SYSTEMS OF AUTONOMOUS VEHICLES

(71) Applicant: GM Cruise Holdings LLC, San Francisco, CA (US)

(72) Inventors: Matt Cox, San Francisco, CA (US); Robert Vets, Seattle, WA (US); Peter Megson, San Francisco, CA (US); Cornelis Jacob Lekkerkerker, San Francisco, CA (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 462 days.

(21) Appl. No.: 16/586,036

(22) Filed: Sep. 27, 2019

(65) Prior Publication Data
US 2021/0096218 A1    Apr. 1, 2021

(51) Int. Cl.
| | | |
|---|---|---|
| G01C 3/00 | (2006.01) | |
| G01S 7/48 | (2006.01) | |
| G01S 17/931 | (2020.01) | |
| G01S 17/42 | (2006.01) | |
| G05D 1/00 | (2006.01) | |
| G05D 1/02 | (2020.01) | |

(52) U.S. Cl.
CPC ............ *G01S 7/4804* (2013.01); *G01S 17/42* (2013.01); *G01S 17/931* (2020.01); *G05D 1/0088* (2013.01); *G05D 1/0231* (2013.01); *G05D 2201/0213* (2013.01)

(58) Field of Classification Search
CPC .......... G01B 11/026; G01C 3/02; G01C 3/32; G01C 3/08; G01C 3/22
USPC .......................................................... 356/3
See application file for complete search history.

(56) References Cited

U.S. PATENT DOCUMENTS

| | | |
|---|---|---|
| 2017/0293016 A1 | 10/2017 | McCloskey et al. |
| 2017/0307736 A1 | 10/2017 | Donovan |
| 2018/0196125 A1 | 7/2018 | Irish |
| 2018/0259645 A1 | 9/2018 | Shu et al. |
| 2019/0018416 A1 | 1/2019 | Gassend |
| 2019/0129014 A1 | 5/2019 | Merritt et al. |
| 2019/0178991 A1 | 6/2019 | Hall et al. |
| 2019/0285749 A1 | 9/2019 | Chen et al. |
| 2019/0353787 A1 | 11/2019 | Petit et al. |

(Continued)

FOREIGN PATENT DOCUMENTS

| | | |
|---|---|---|
| GB | 2586552 A | 2/2021 |
| WO | 2016032780 A1 | 3/2016 |
| WO | 2021061179 A1 | 4/2021 |

OTHER PUBLICATIONS

"International Search Report for PCT Patent Application No. PCT/US2019/068849", dated Aug. 27, 2020, 6 Pages.

(Continued)

*Primary Examiner* — Md M Rahman
(74) *Attorney, Agent, or Firm* — Calfee, Halter & Griswold LLP

(57) ABSTRACT

An autonomous vehicle having a lidar sensor system is described. A computing system is configured to determine that the lidar sensor system is to update a code that is included in light signals emitted by the lidar sensor system. The computing system transmits a command signal to the lidar sensor system, wherein the command signal causes the lidar sensor system to transition from emitting light signals with a first code therein to emitting light signals with a second code therein, wherein the first code is different from the second code.

20 Claims, 7 Drawing Sheets

(56) References Cited

U.S. PATENT DOCUMENTS

2021/0096219 A1  4/2021  Cox et al.
2021/0242354 A1  8/2021  Wang et al.

OTHER PUBLICATIONS

"Written Opinion of the International Searching Authority for PCT Patent Application No. PCT/US2019/068849", dated Aug. 27, 2020, 12 Pages.
"Office Action for European Patent Application No. 19842730.4", dated Mar. 11, 2022, 3 pages.
"Final Office Action for U.S. Appl. No. 16/731,230", dated Jun. 2, 2022, 23 pages.
"Office Action for U.S. Appl. No. 16/731,230", dated Feb. 9, 2022, 20 pages.
"Response to the Office Action for U.S. Appl. No. 16/731,230", Filed Date: May 9, 2022, 13 pages.

MITIGATING INTERFERENCE FOR LIDAR SYSTEMS OF AUTONOMOUS VEHICLES

BACKGROUND

An autonomous vehicle is a motorized vehicle that can navigate without a human driver. An exemplary autonomous vehicle includes a plurality of sensor systems such as, but not limited to, a lidar sensor system, a radar sensor system, a camera sensor system, amongst others, wherein the autonomous vehicle is controlled based upon sensor signals output by the sensor systems. For example, a lidar sensor system may emit a light signal comprising a light pulse, wherein light in the light signal has a wavelength in the near infrared range. The light signal reflects off an object and returns to a detector of the lidar sensor system. Based on a time between when the lidar sensor system emits the light signal and when the detector detects the light signal after the light signal has reflected off the object, the lidar sensor system can determine a distance between the object and the lidar sensor system. In operation, the lidar sensor system emits light signals in a plurality of directions within a relatively small window of time, such that the lidar sensor system generates a three-dimensional point cloud that is indicative of positions of objects in an environment surrounding the lidar sensor system. A mechanical system of the autonomous vehicle (such as a steering system, a braking system, or a propulsion system) can then be controlled based upon the generated point cloud.

Conventionally, the detector of the lidar sensor system is configured to detect light signals that are formed of light having a frequency that is within a predefined frequency band. Hence, a conventional lidar sensor system is susceptible to interference, wherein interference occurs when the detector of the lidar sensor system detects a light signal that was not emitted by the lidar sensor system. In an example, a detector of a first lidar sensor system may detect a light signal emitted by a second lidar sensor system, and thus the point cloud generated by the first lidar sensor system may include an inaccuracy that corresponds to the detected light pulse. Instances of interference can be expected to increase as autonomous vehicles become increasingly popular. Additionally, instances of interference can be expected to increase as autonomous vehicles are configured to include more than one lidar sensor system.

SUMMARY

The following is a brief summary of subject matter that is described in greater detail herein. This summary is not intended to be limiting as to the scope of the claims.

Described herein are various technologies pertaining to mitigating interference with respect to a lidar sensor system that is mounted on or incorporated in an autonomous vehicle. Further, the technologies described herein are also applicable to radar sensor systems mounted on or incorporated in autonomous vehicles. With more specificity, aspects described herein involve a lidar sensor system emitting a light signal that is constructed by the lidar sensor system such that the emitted light signal has a code therein, wherein the code can differentiate the emitted light signal from another light signal emitted by another lidar sensor system. The lidar sensor system can include the code in the light signal, for example, by shaping one or more light pulses in the light signal and/or emitting a pattern of light pulses. Hence, when a detector of the lidar sensor system detects a light signal, the lidar sensor system can ascertain whether a code in the detected light signal matches the code in the emitted light signal, and therefore determine whether the detected light signal was emitted by the lidar sensor system.

In addition, the lidar sensor system can be configured to alter codes in light signals emitted by the lidar sensor system based upon a command signal transmitted to the lidar sensor system by a computing system that is in communication with the lidar sensor system. For example, the command signal can be based upon one or more parameters, including but not limited to detected interference; proximity of another autonomous vehicle to the autonomous vehicle; orientation of the autonomous vehicle; passage of some predefined amount of time; etc. As indicated previously, the command signal can cause the lidar sensor system to transition from emitting light signals having a first code therein to emitting light signals having a second code therein. Altering codes included in light signals emitted by the lidar sensor system facilitates avoiding interference, as a code in a light signal can be altered to reduce a probability that another lidar sensor system will emit a light signal with the (same) code.

In an exemplary embodiment, as referenced above, the computing system can generate the command signal based upon a determined orientation of the autonomous vehicle, wherein the command signal causes the lidar sensor system to emit a light signal with a code, wherein the code is based upon the orientation of the autonomous vehicle. For example, when the autonomous vehicle is facing west, the computing system can cause the lidar sensor system to emit light signals with a first code; when the autonomous vehicle is facing east, the computing system can cause the lidar sensor system to emit light signals with a second code; when the autonomous vehicle is facing north, the computing system can cause the lidar sensor system to emit light signals with a third code; and when the autonomous vehicle is facing south, the computing system can cause the lidar sensor system to emit light signals with a fourth code. When several autonomous vehicles in a fleet of autonomous vehicles have lidar sensor systems that emit light signals with codes based upon orientations of such autonomous vehicles, probability of a lidar sensor system of any one of the autonomous vehicles being subjected to interference with respect to light signals emitted in the direction of travel of the autonomous vehicle may be reduced when compared to conventional lidar sensor systems.

In another exemplary embodiment, the computing system can generate the command signal based upon a geospatial position of the autonomous vehicle, wherein a code included in light signals emitted by the lidar sensor system is based upon the geospatial position of the autonomous vehicle. This embodiment is particularly well-suited for avoiding interference when geospatial positions of other autonomous vehicles are known or detected. Hence, when the computing system ascertains that the autonomous vehicle is in proximity to a second autonomous vehicle (e.g., based upon a first reported geospatial position of the autonomous vehicle and a second reported geospatial position of the second autonomous vehicle), the computing system may cause a command signal to be transmitted to the lidar sensor system, wherein the command signal causes a first code to be included in light signals emitted by the lidar sensor system that is different from a second code that is included in light signals emitted by a second lidar sensor system of the second autonomous vehicle. Therefore, when a first autonomous vehicle and a second autonomous vehicle are detected as being in geographic proximity to one another, a first lidar sensor system of the first autonomous vehicle can be caused to emit first light signals with a first code included therein and a second lidar sensor system of the second autonomous vehicle can be caused to emit second light signals with a second code included therein. Thus, for instance, when a light signal with the second code included therein is incident upon a detector of the first lidar sensor system, the first lidar sensor system can ascertain that the light signal was not emitted by the first lidar sensor system, thereby avoiding interference.

In yet another exemplary embodiment, the computing system can generate the command signal based upon detected interference, such that when interference is detected the lidar sensor system is caused to alter a code included in light signals emitted by the lidar sensor system. The computing system can be configured to detect occurrence of interference based upon one or more point clouds output by the lidar sensor system, and upon detecting occurrence of interference, can transmit a command signal that causes the lidar sensor system to alter a code that is included in light signals emitted by the lidar sensor system. The computing system can detect interference by, for example, comparing a point in a point cloud with surrounding points in the point cloud, and if the point is significantly different from the surrounding points, the computing system can transmit the command signal. In another example, the computing system can detect interference by comparing a point in a point cloud with a corresponding point in one or more previously generated point clouds.

In yet another exemplary embodiment, the computing system is configured to alter a code that is included in light signals emitted by a lidar sensor system after a threshold amount of time has passed since the code was altered. Thus, for example, the computing system can cause the code to be randomly altered every ten minutes.

In still yet another exemplary embodiment, the computing system can cause the lidar sensor system to emit light signals with different codes in different directions. Hence, light signals emitted in a northerly direction by the lidar sensor system may include a first code, while light signals emitted in a southerly direction by the lidar sensor system may include a second code. When detecting light signals, the lidar sensor system can ascertain whether signals have the first code when such signals are received from the north and can ascertain whether signals have the second code when such signals are received from the south.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
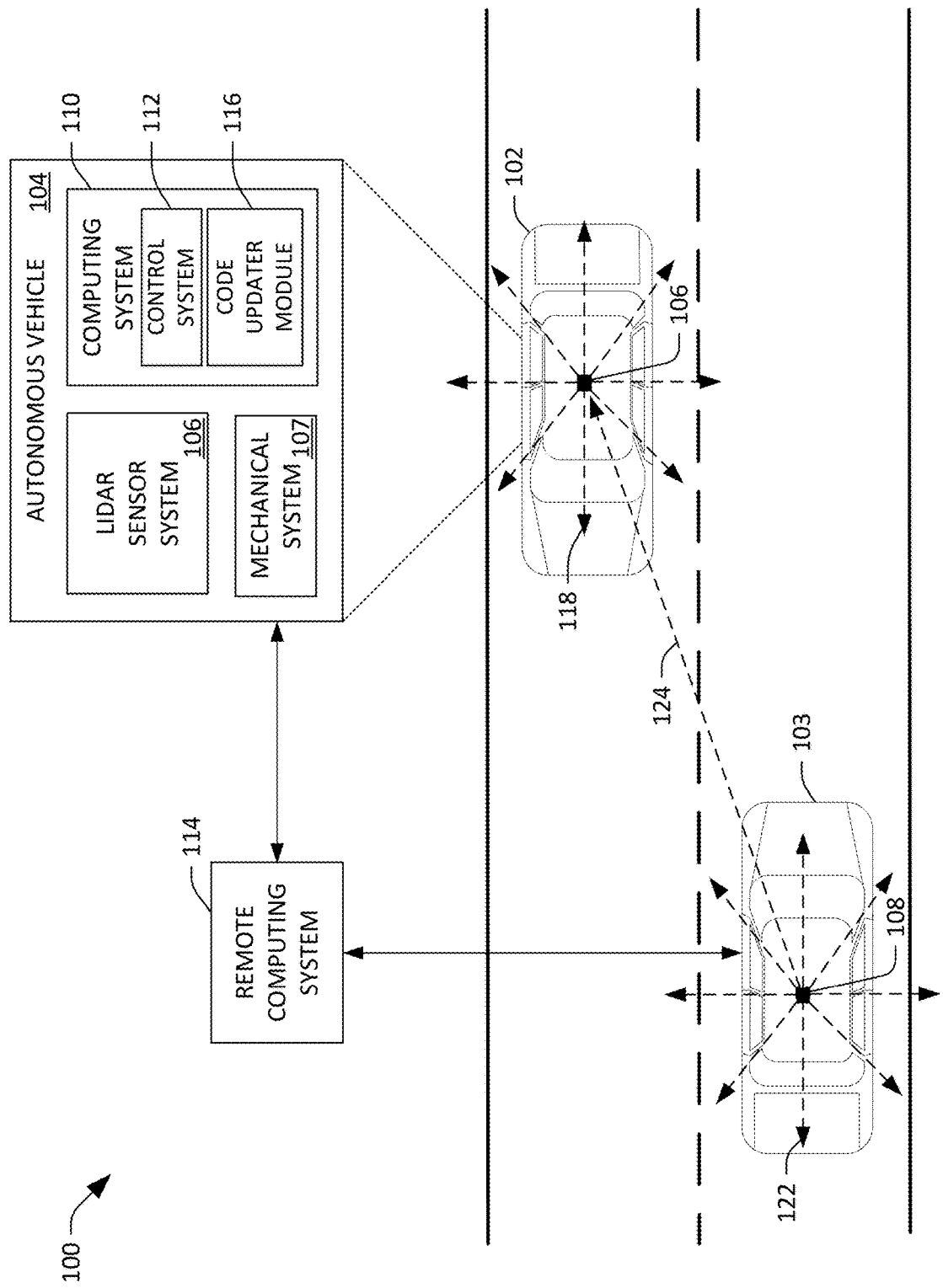
FIG. 1 is a schematic that illustrates autonomous vehicles having lidar sensor systems respectively mounted thereon or incorporated therein, wherein the lidar sensor systems emit light pulses with different codes include therein.

Various technologies pertaining to lidar sensor systems are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B.

In addition, the articles "a" and "an" as used in this application and the appended claims should generally be construed to mean "one or more" unless specified otherwise or clear from the context to be directed to a singular form.

Further, as used herein, the terms "component", "module", and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

Moreover, as used herein, the term "exemplary" is intended to mean serving as an illustration or example of something and is not intended to indicate a preference.

The technologies described herein are related to including codes in light signals emitted by lidar sensor systems that are incorporated in or mounted onto autonomous vehicles, wherein the codes are included to mitigate occurrences of interference. Interference occurs when a lidar sensor system detects a light signal that was emitted by a light source other than an emitter of the lidar sensor system and generates a point cloud based upon such light signal. Hence, when interference occurs, the point cloud generated by the lidar sensor system will include an inaccuracy.

With reference now to FIG. 1, an exemplary environment 100 is illustrated, wherein the environment 100 includes a first autonomous vehicle 102 and a second autonomous vehicle 103. The first autonomous vehicle 102 has a first lidar sensor system 106 mounted thereon or incorporated therein and the second autonomous vehicle 103 has a second lidar sensor system 108 mounted thereon or incorporated therein. The first autonomous vehicle 102 includes componentry depicted in call-out 104. As illustrated, the first autonomous vehicle 102 comprises the first lidar sensor system 106, a mechanical system 107 (e.g., a vehicle propulsion system, a steering system, a braking system, etc.), and a computing system 110. The computing system 110 includes a processor and memory (not shown), wherein a control system 112 is stored in the memory and executed by the processor. Generally, the computing system 110 receives output of the first lidar sensor system 106, and the control system 112 controls the mechanical system 107 based upon the output of the first lidar sensor system 106 (and optionally outputs of other sensor systems of the first autonomous vehicle 102, such as cameras, a GPS sensor, radar sensor systems, etc.), The memory of the computing system 110 also has a code updater module 116 stored therein, wherein the code updater module is configured to update a code included in light signals emitted by the lidar sensor system 106. With more specificity, the code updater module 116 causes the computing system 110 to transmit a command signal to the first lidar sensor system 106 based upon one or more parameters, including orientation of the first autonomous vehicle 102, time, geospatial position of the first autonomous vehicle 102, whether or not interference has been detected, etc. The first lidar sensor system 106, upon receiving the command signal, updates a code that is included in light signals emitted by the first lidar sensor system 106. For instance, upon receiving the command signal, the first lidar sensor system 106 transitions from including a first code in light signals emitted by the first lidar sensor system 106 to including a second code in light signals emitted by the first lidar sensor system 106, wherein the first code and the second code are different. As will be described in greater detail below, the code included in light signals emitted by first lidar sensor system 106 is updated to mitigate incidences of interference at the first lidar sensor system 106, In an exemplary embodiment, the first lidar sensor system 106 is a spinning lidar system that includes an array of light emitters (e.g., laser diodes) and a corresponding array of photodetectors, wherein when the first lidar sensor system 106 is operating, these arrays revolve 360 degrees about a central axis, with the light emitters emitting light signals as the array of light emitters revolves. In another exemplary embodiment, the first lidar sensor system 106 may be a scanning lidar that covers a horizontal field of view (or other suitable field of view), such as a 60-120 degree field of view. Each light signal emitted by each light emitter includes one or more light pulses. The first lidar sensor system 106 further includes a timer, wherein the first lidar sensor system 106 detects distance between the first lidar sensor system 106 and an object in the environment 100 based upon an amount of time between a first time when a light signal was emitted by a light emitter and a second time when the light signal was detected by a photodetector in the array of photodetectors. In an exemplary embodiment, each light emitter in the array of light emitters may emit roughly 16 light signals per 55 microsecond revolution.

In addition, the first lidar sensor system 106 includes circuitry that is configured to include a code in an electrical signal, wherein the electrical signal is provided to a light emitter, and further wherein a light signal emitted by the light emitter is based upon the electrical signal (e.g., the light emitter is driven by the electrical signal). Hence, the light signal includes the code. In an example, the circuitry can modulate amplitude and/or a frequency of the electrical signal to form the code. Additionally or alternatively, the circuitry can include variable capacitance filters, variable resistors, diodes, etc. The circuitry can be configured to shape electrical pulses that drive the light emitters, can be configured to generate the light signal to include a sequence of pulses, can be configured to generate the light signal to include a pulse with a particular rise time, magnitude, etc. In an example, the lidar sensor system may include firmware, wherein a finite number of codes are stored in the firmware, and further wherein the circuitry can construct electrical signals that include a code in the finite number of codes stored in the firmware.

In the environment 100, the remote computing system 114 is in communication with the first autonomous vehicle 102 and the second autonomous vehicle 103. For instance, the remote computing system 114 can transmit commands to the first autonomous vehicle 102 and the second autonomous vehicle 103, wherein the commands inform the autonomous vehicles 102 and 103 of travel destinations for such vehicles. The remote computing system 114 can also transmit information to the autonomous vehicles 102 and 103 that such vehicles 102 and 103 can employ while navigating streets, such as locations of heavy traffic, locations of accidents, and so forth. Further, the remote computing system 114 can receive geospatial positions of the autonomous vehicles 102 and 103 as the autonomous vehicles navigate a geographic region. Accordingly, the autonomous vehicles 102 and 103 may belong to a fleet, wherein each autonomous vehicle in the fleet reports its position to the remote computing system 114.

In operation, the first lidar sensor system 106 of the first autonomous vehicle 102 emits light signals that include one of the finite number of codes defined in the firmware of the lidar sensor system 106. A light signal in the light signals (e.g., light signal 118) travels into the environment, reflects off of an object, and is detected by the first lidar sensor system 106 upon reflecting off of the object. The lidar sensor system 106, upon detecting the light signal, determines whether the light signal includes the code. When the light signal includes the code, the first lidar sensor system 106 generates a point cloud based upon the detected light signal. When the light signal does not include the code, the first lidar sensor system 106 identifies the detected light signal as being interference (e.g., the first lidar sensor system 106 can filter the detected light signal). For instance, when the detector of the first lidar sensor system 106 detects a light signal emitted by the second lidar sensor system 108, the first lidar sensor system 106 can determine that a code in the light signal is not the same code that is included in light signals emitted by the first lidar sensor system 106, and can ascertain that such light signal is interference. The first lidar sensor system 106 outputs a point cloud based upon detected light signals, and the control system 112 controls the mechanical system 107 based upon the point cloud.

Because the firmware of the first lidar sensor system 106 supports a limited number of codes, a code may not be unique to a lidar sensor system. For instance, even though the first lidar system 106 and the second lidar system 108 can output light signals with different codes, due to the finite number of supported codes, it is possible that both the first lidar system 106 and the second lidar system 108 may emit light signals having the same code within a same time window, thus leaving open the possibility of interference. The code updater module 116 transmits command signals that are configured to update the code included in light signals based upon one or more parameters to mitigate occurrence of interference. Such parameters include, but are not limited to: 1) geospatial position of the first autonomous vehicle 102 (e.g., relative to the geospatial position of the second autonomous vehicle 103); 2) orientation of the first autonomous vehicle 102 (e.g., direction of travel of the first autonomous vehicle 102); 3) existence of interference; 4) an amount of time since the code was last updated; and/or 5) direction in which light signals are transmitted (e.g., northerly, southerly, easterly, westerly). Operation of the code updater module 116 with respect to such parameters is described below.

In a first example, the code updater module 114 can cause the code included in light signals emitted by the first lidar sensor system 106 to be updated based upon geospatial position of the first autonomous vehicle 102 and geospatial position of the second autonomous vehicle 103. As indicated previously, the remote computing system 114 is in communication with both the first autonomous vehicle 102 and the second autonomous vehicle 103, wherein the autonomous vehicles 102 and 103 report their geospatial positions to the remote computing system 114. in addition, the autonomous vehicles 102 and 103 can report, to the remote computing system 114, code identifiers that identify codes that are being included in light signals emitted by the first lidar sensor system 106 and the second lidar sensor system 108, respectively. The remote computing system 114 can ascertain that the first autonomous vehicle 102 and the second autonomous vehicle 103 are in geographic proximity to one another based upon the geospatial positions reported by the autonomous vehicles 102 and 103 to the remote computing system 114. In addition, the remote computing system 114 can ascertain that the first lidar sensor system 106 and the second lidar sensor system 108 are emitting light signals that include the same code (or that both the first lidar sensor system 106 and the second lidar sensor system 108 are emitting light signals with no codes therein).

To prevent occurrence of interference, the remote computing system 114 can transmit an instruction to the first autonomous vehicle 102, wherein the instruction instructs the first autonomous vehicle 102 to update the code included in light signals emitted by the first lidar sensor system 106 from a first code to a second code. The code updater module 114 receives the instruction and causes the computing system 110 of the first autonomous vehicle 102 to transmit a command signal to the first lidar sensor system 106, wherein the command signal is configured to cause the first lidar sensor system 106 to update the code included in light signals emitted thereby. The first lidar sensor system 106, based upon the command signal, updates the code included in the light signals emitted by the first lidar sensor system 106, such that the first lidar sensor system 106 and the second lidar sensor system 108 are no longer emitting light signals that include the same code. Hence, in an example, when the first lidar sensor system 106 detects a light signal (e.g., light signal 124) emitted by the second lidar sensor system 108, the first lidar sensor system 106 can ascertain that the light signal 124 includes a code that is different from a code included in light signals emitted by the first lidar sensor system 106, and interference is avoided.

In an alternative embodiment, the first autonomous vehicle 102 and the second autonomous vehicle 103 report geospatial positions of the autonomous vehicles 102 and 103 to each other by way of, for example, a mesh network. Thus, the first autonomous vehicle 102 can receive, from the second autonomous vehicle 103, the geospatial position of the second autonomous vehicle 103 (and can additionally receive an identifier for a code included in light signals being emitted by the second lidar sensor system 108). The code updater module 116 can determine that the second autonomous vehicle 103 is within some predefined distance of the first autonomous vehicle 102, can further determine that the first lidar sensor system 106 and the second lidar sensor system 108 are emitting light signals with the same code, and based upon such determinations, can cause the first lidar sensor system 106 to update the code included in light signals emitted by the first lidar sensor system 106.

In a second example, the code updater module 116 can cause the code included in light signals emitted by the first lidar sensor system 106 to be updated based upon orientation of the first autonomous vehicle 102. For instance, the first autonomous vehicle 102 can include a digital compass (not shown) that can output a direction that the first autonomous vehicle 102 is facing (e.g., a direction of travel). The code updater module 116 can select the code to be included in light signals emitted by the first lidar sensor system 106 based upon such direction. For example, as the orientation of the first autonomous vehicle 102 changes over time, the code updater module 116 can cause codes included in light signals emitted by the first lidar sensor system 106 to be updated. For instance, when the first autonomous vehicle 102 is facing east, the code updater module 116 can cause the computing system 110 to transmit a command signal to the first lidar sensor system 106, wherein the command signal causes the first lidar sensor system 106 to emit light signals with a first code therein; when the first autonomous vehicle 102 is facing north, the code updater module 116 can cause the computing system 110 to transmit a command signal to the first lidar sensor system 106, wherein the command signal causes the first lidar sensor system 106 to emit light signals with a second code therein; etc. Such an arrangement is beneficial in mitigating instances of interference in the direction of travel of the first autonomous vehicle 102, as a lidar sensor system of an autonomous vehicle travelling in the opposite direction will be configured to emit light signals with a different code than the code included in the light signals emitted by the first lidar sensor system 106.

In an alternative embodiment, the code updater module 116 can control the first lidar sensor system 106 to include a code in a light signal based upon a direction that the light signal is emitted from the first lidar sensor system 106. Hence, the first lidar sensor system 106 can be controlled to emit a first light signal with a first code therein in a first direction and can be controlled to emit a second light signal with a second therein in a second direction, wherein the first code and the second code are different. In a specific example, the code updater module 116 can cause, in a revolution, the first lidar sensor system 106 to: 1) emit a first light signal with a first code therein in a northerly direction; 2) emit a second light signal with a second code therein in a westerly direction; 3) emit a third light signal with a third code therein in a southerly direction; and 4) emit a fourth light signal with a fourth code therein in an easterly direction. The first lidar system 106 can be configured to identify interference based upon a code and a direction from which a light signal is detected. Continuing with the example set forth above, when the detector of the first lidar sensor system 106 detects a light signal from the northerly direction and determines that the light signal has the third code therein (rather than the first code), the first lidar system 106 can identify the light signal as interference. When both the first autonomous vehicle 102 and the second autonomous vehicle 103 are configured to include codes in light signals in the manner described above, the first lidar sensor system 106 will identify the light signal 124 emitted from the second lidar sensor system 108 as interference, as such light signal 124 will not include the same code as the light signal 118 emitted from the first lidar sensor system 106.

In a third example, the code updater module 116 can cause the first lidar sensor system 106 to alter a code included in light signals emitted by the first lidar sensor system 106 upon detection of interference. For example, the first lidar sensor system 106 and the second lidar sensor system 108 may emit light signals that include the same code; accordingly, the first lidar sensor system 106 may (incorrectly) compute a point in a point cloud based upon the light signal 124 emitted by the second lidar sensor system 108 of the second autonomous vehicle 103. The computing system 110 processes point clouds output by the first lidar sensor system 106 and determines possible occurrence(s) of interference based upon one or more of the point clouds. For example, an anomalous point in the point cloud can indicate occurrence of interference. In another example, an immediate (and relatively large) change in corresponding points of adjacent point clouds can indicate occurrence of interference. When the computing system 110 identifies possible interference based upon point clouds output by the first lidar sensor system 106, the code updater module 116 can transmit a command that causes the code included in the light signals emitted by the first lidar sensor system 106 to be updated. This embodiment is particularly well-suited for scenarios where the autonomous vehicles 102 and 103 do not belong to the same fleet (e.g., the remote computing system 114 fails to be in communication with at least one of the autonomous vehicles 102 or 103). Thus, for example, the first autonomous vehicle 102 may be unaware that the autonomous vehicle 103 includes a lidar sensor system that emits light pulses. The first lidar sensor system 106 can detect the light signal 124 emitted by the second lidar sensor system 108 and can generate a point cloud based upon the first lidar sensor system 106 detecting the light signal 124. The computing system 110 receives the point cloud and ascertains that the point cloud includes at least one point therein that has a value that is based upon existence of interference. The code updater module 116 then causes the computing system 110 to transmit a command to the lidar sensor system 106, and the lidar sensor system 106 updates the code upon receiving such command signal.

In a fourth example, the code updater module 116 can cause the computing system 110 to transmit a command signal that causes the first lidar sensor system 106 to update a code included in light signals emitted by the first lidar sensor system 106 upon a predefined amount of time passing since the code was most recently updated. Hence, for instance, every ten minutes the code updater module 116 can cause the code included in light signals emitted by the first lidar sensor system 106 to be randomly updated (which may be well-suited to mitigate possibility of malicious interference).

Moreover, the code updater module 116 can cause a code included in light signals emitted by the first lidar system 106 to be updated based upon a combination of one or more of the parameters referenced above. For instance, the code updater module 116 can cause the code to be randomly updated periodically and can further cause the code to be updated upon detection of interference. In another example, the code updater module 116 can cause the code to be updated based upon geospatial position and orientation of the first autonomous vehicle 102.

Moreover, it is contemplated that the first autonomous vehicle 102 may have several lidar sensor systems mounted thereon or incorporated therein. The code updater module 116 can transmit commands to the several lidar sensor systems that cause such lidar sensor systems to emit light signals with different codes therein, thereby precluding interference between the several lidar sensor systems.

Figure 2:
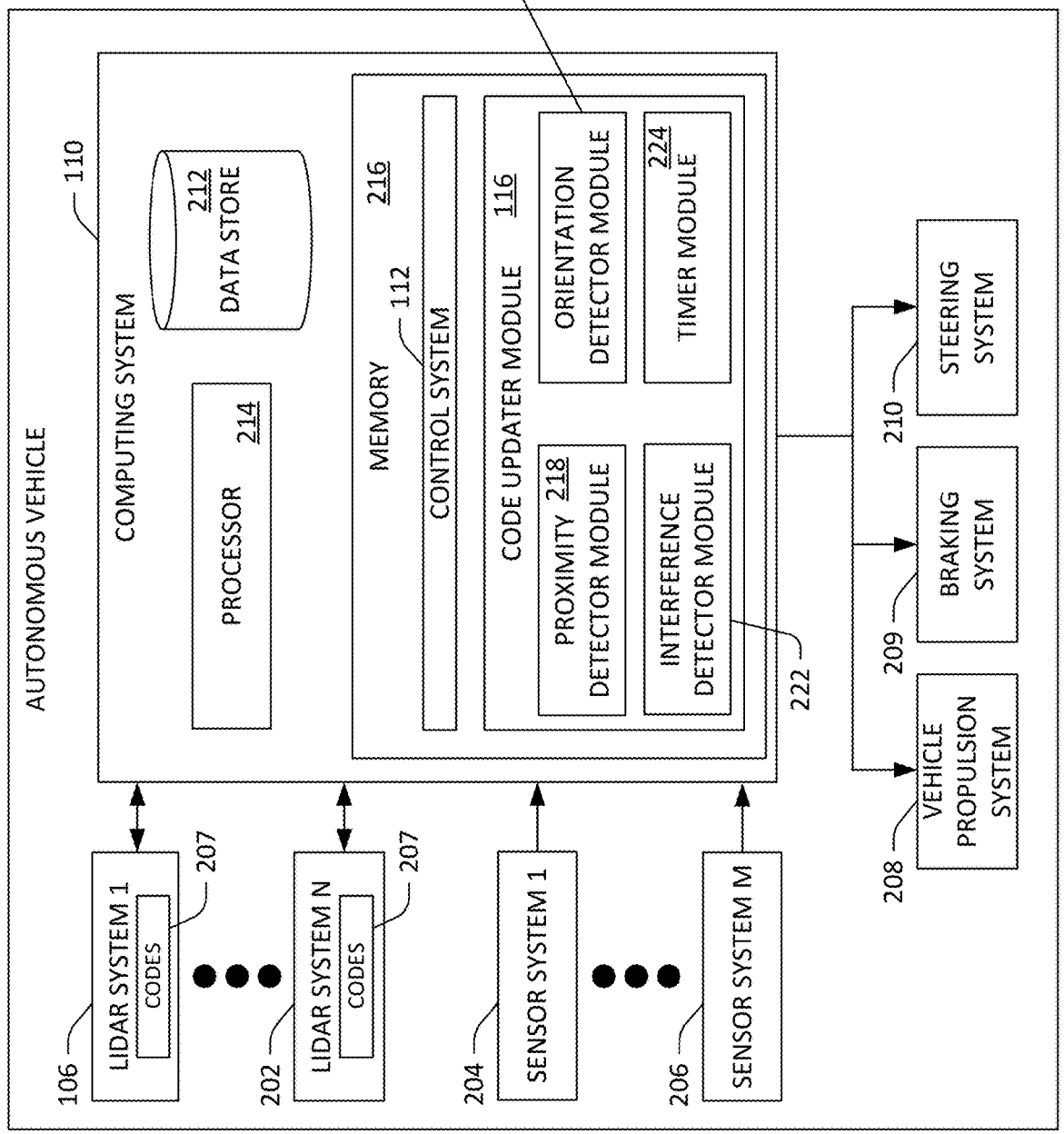
FIG. 2 is a functional block diagram of an exemplary autonomous vehicle.

With reference now to FIG. 2, a functional block diagram of the first autonomous vehicle 102 is illustrated. The first autonomous vehicle 102 includes several lidar sensor systems: the first lidar sensor system 106 through an Nth lidar sensor system 202 The lidar systems 106 and 202 have codes 207 stored in firmware of the lidar systems 106 and 202. In an example, the codes 207 may include five codes, ten codes, fifteen codes, or twenty codes. The first autonomous vehicle 102 additionally includes a plurality of sensor systems 204-206 that are arranged about the first autonomous vehicle 102, wherein the sensor systems 204-206 may include a camera, a GPS sensor, an accelerometer, etc.

The first autonomous vehicle 102 further includes several mechanical systems that can be used to effectuate appropriate motion of the first autonomous vehicle 102. For instance, the mechanical systems can include but are not limited to a vehicle propulsion system 208, a braking system 209, and a steering system 210. The vehicle propulsion system 208 may include an electric motor, an internal combustion engine, or both. The braking system 209 can include an engine brake, actuators, and/or any other suitable componentry that is configured to assist in decelerating the first autonomous vehicle 102. The steering system 210 includes suitable componentry that is configured to control the direction of movement of the first autonomous vehicle 102 during propulsion.

The first autonomous vehicle 102 additionally comprises the computing system 110, which is in communication with the lidar sensor systems 106 and 202, the sensor systems 204-206, and the mechanical systems 208-210. The computing system 110 comprises a data store 212, a processor 214, and memory 216 that includes instructions that are executed by the processor 214. In an example, the processor 214 can be or include a graphics processing unit (CPU), a plurality of GPUs, a central processing unit (CPU), a plurality of CPUs, an application-specific integrated circuit (ASIC), a microcontroller, a programmable logic controller (PLC), a field programmable gate array (FPGA), or the like.

Memory 216 has the control system 112 stored therein, wherein the control system 112 is configured to receive outputs of the lidar sensor systems 106 and 202 and outputs of the sensor systems 204-206 and control one or more of the mechanical systems 208-210 based upon such outputs. The memory 216 further has the code updater module 116 stored therein, wherein the code updater module 116 optionally includes a proximity detector module 218, an orientation detector module 220, an interference detector module 220, and a time interval module 222. The proximity detector module 218 is configured to ascertain that another autonomous vehicle is in geographic proximity to the first autonomous vehicle 102 (e.g., within some threshold distance of the first autonomous vehicle 102, travelling on a same street as the first autonomous vehicle 102, etc.). In an example, the proximity detector module 218 can receive geospatial coordinates of the first autonomous vehicle 102 from one of the sensors 204-206 and can receive geospatial coordinates of another autonomous vehicle from another computing system (e.g., the remote computing system 114 or a computing system of the another autonomous vehicle directly). When the proximity detector module 218 ascertains that the another autonomous vehicle is in geographic proximity to the first autonomous vehicle 102, the proximity detector module 218 can ascertain whether, for example, the first lidar sensor system 106 is including codes in light signals emitted by the first lidar sensor system 106. When the first lidar sensor system 106 fails to be including codes in emitted light signals, the proximity detector module 218 can cause the computing system 110 to transmit a command to the first lidar sensor system 106, wherein the command is configured to cause the first lidar sensor system 106 to include a code from the codes 207 in emitted light signals.

In another example, the proximity detector module 218 can receive an identifier for a code that is included in light signals emitted by the first lidar sensor system 106, and can further receive an identifier for a code that is included in light signals emitted by a lidar sensor system of the autonomous vehicle that is in geographic proximity to the first autonomous vehicle 102. The proximity detector module 218 compares the identifiers for the codes, and when the identifiers are the same, the proximity detector module 218 causes the computing system 110 to transmit a command signal to the first lidar sensor system 106, wherein the command signal is configured to cause the first lidar sensor system 106 to alter the code that is included in emitted light signals.

In yet another example, the control system 112 can ascertain that an image output by one of the sensor systems 204-206 includes another autonomous vehicle, and the control system 112 can pass a message to the code updater module 116 that the image includes the another autonomous vehicle. In response to receiving such message, the proximity detector module 218 can determine whether the first lidar sensor system 106 is including a code in light signals emitted thereby. When the light signals fail to include a code, the proximity detector module 218 can cause the computing system 110 to transmit a command to the first lidar sensor system 106, wherein the command is configured to cause the first lidar sensor system 106 to include a code in light signals emitted thereby.

The orientation detector module 220 is configured to determine an orientation of the first autonomous vehicle 102 based upon output of a sensor in the sensor systems 204-206 and is further configured to cause the computing system 110 to transmit command signals to the first lidar sensor system 106 based upon the orientation of the first autonomous vehicle 102. Thus, the orientation detector module 220 can cause the computing system 110 to transmit a command signal that causes a code included in light signals emitted by the first lidar sensor system 106 to alter as the orientation (e.g., direction of travel) of the first autonomous vehicle 102 alters. In addition, as described above, the orientation detector module 220 can cause the computing system 110 to transmit command signals to the first lidar sensor system 106 that cause the first lidar sensor system 106 to include codes in light signals as a function of direction that the light signals are emitted.

The interference detector module 222 is configured to identify instances of interference, wherein, for example, the first lidar sensor system 106 detects a light signal emitted by another lidar sensor system of another autonomous vehicle. The interference detector module 222. can identify instances of interference based upon point clouds generated by the first lidar sensor system 106. In another example, when the first autonomous vehicle includes multiple lidar sensor systems, the interference detector module 222 can identify instances of interference based upon a comparison between point clouds generated by the lidar sensor systems. For instance, a field of view of the first lidar sensor system 106 and the Nth lidar sensor system 202 may partially overlap, and the interference detector module 222 can identify interference when points in the point clouds in an overlapping region are inconsistent (e.g., a threshold distance disparity exists between points that correspond to a single scene location). Upon detecting interference, the interference detector module 222 can cause the computing system 110 to transmit a command signal to the first lidar sensor system 106, wherein the command signal is configured to cause the first lidar sensor system 106 to begin including codes in light signals emitted by the first lidar sensor system 106 or to alter a code included in light signals emitted by the first lidar sensor system.

The timer module 224 is configured to periodically cause the computing system 110 to transmit a command signal to one or more of the lidar sensor systems 106 and 202, wherein the command signal is configured to cause the lidar sensor systems 106 and 202 to alter codes included in light signal emitted thereby. An amount of time between when the timer module 224 causes the computing system 110 to transmit commands can depend upon, for example, a number of codes in the codes 207, time of day, a density of autonomous vehicles within a given area, a geographic location of the autonomous vehicle 102, etc.

While the modules 218-224 are illustrated as being included in the computing system 110 of the first autonomous vehicle 102, it is to be understood that one or more of the modules 218-224 may execute on other computing systems. For example, one or more of the modules 218-224 may be executed by a microprocessor of one or more of the lidar sensor systems 106 and 202. In another example, one or more of the modules 218-224 may be executed by the remote computing system 114. Moreover, while operation of the modules 218-224 was set forth with respect to the first lidar sensor system 106, it is to be understood that the modules 218-224 can perform similar acts with respect to other lidar sensor systems in the lidar sensor systems 106 and 202. Further, the code updater module 116 can maintain a list of codes emitted in signals output by several lidar systems of the first autonomous vehicle 102 and can command such lidar sensor systems to include different codes in light signals emitted thereby (thus preventing the lidar sensor systems from generating a point cloud based upon light signals emitted by another of the lidar sensor systems).

Figure 3:
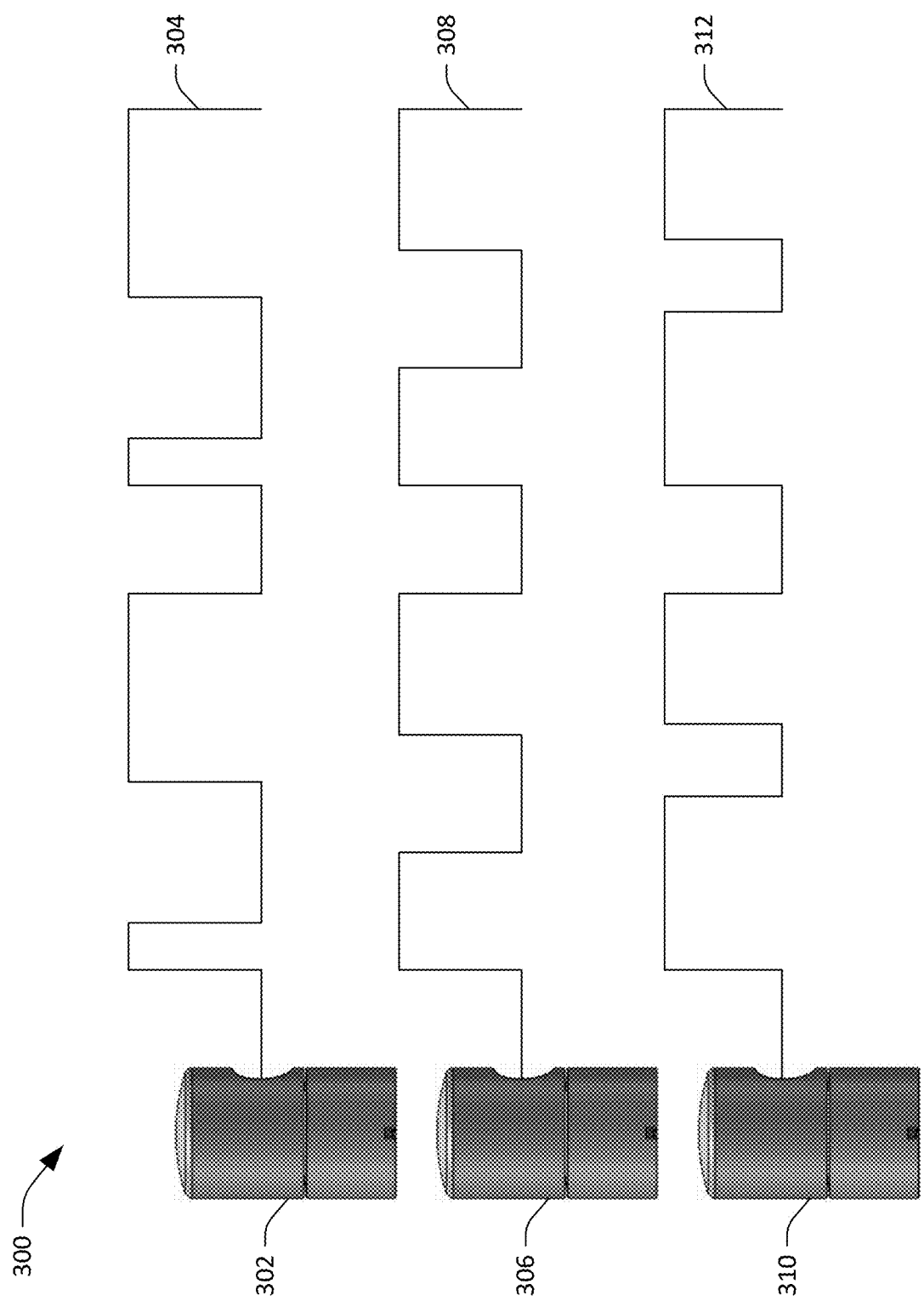
FIG. 3 illustrates a plurality of light signals emitted by a lidar sensor system, wherein the light signals have different codes included therein.

With reference now to FIG. 3, a schematic 300 that illustrates a plurality of codes that can be included in light signals emitted by different lidar sensor systems is illustrated. In the example shown in FIG. 3, the codes are depicted as being respective sequences of pulses, wherein the sequences of pulses are each different from one another. For example, as illustrated, a first lidar sensor system 302 emits a first light signal that comprises a first sequence of pulses 304, a second lidar sensor system 306 emits a second light signal that comprises a second sequence of pulses 308, and a third lidar sensor system 310 emits a third light signal that comprises a third sequence of pulses 312. As can be ascertained, each of the sequence of pulses 304, 308, and 312 is different from each of the other sequences of pulses; thus, if the first lidar sensor system 302 were to receive a light signal that includes the second sequence of pulses 308, the first lidar sensor system 302 can filter such light signal as the light signal does not include the first sequence of pulses 304. While codes are illustrated as being a sequence of pulses, it is to be understood that through pulse shaping a code may be a parameter of a single light pulse, such as rise time, pulse shape (e.g., square versus sawtooth), pulse duration, and so forth.

Figure 4:
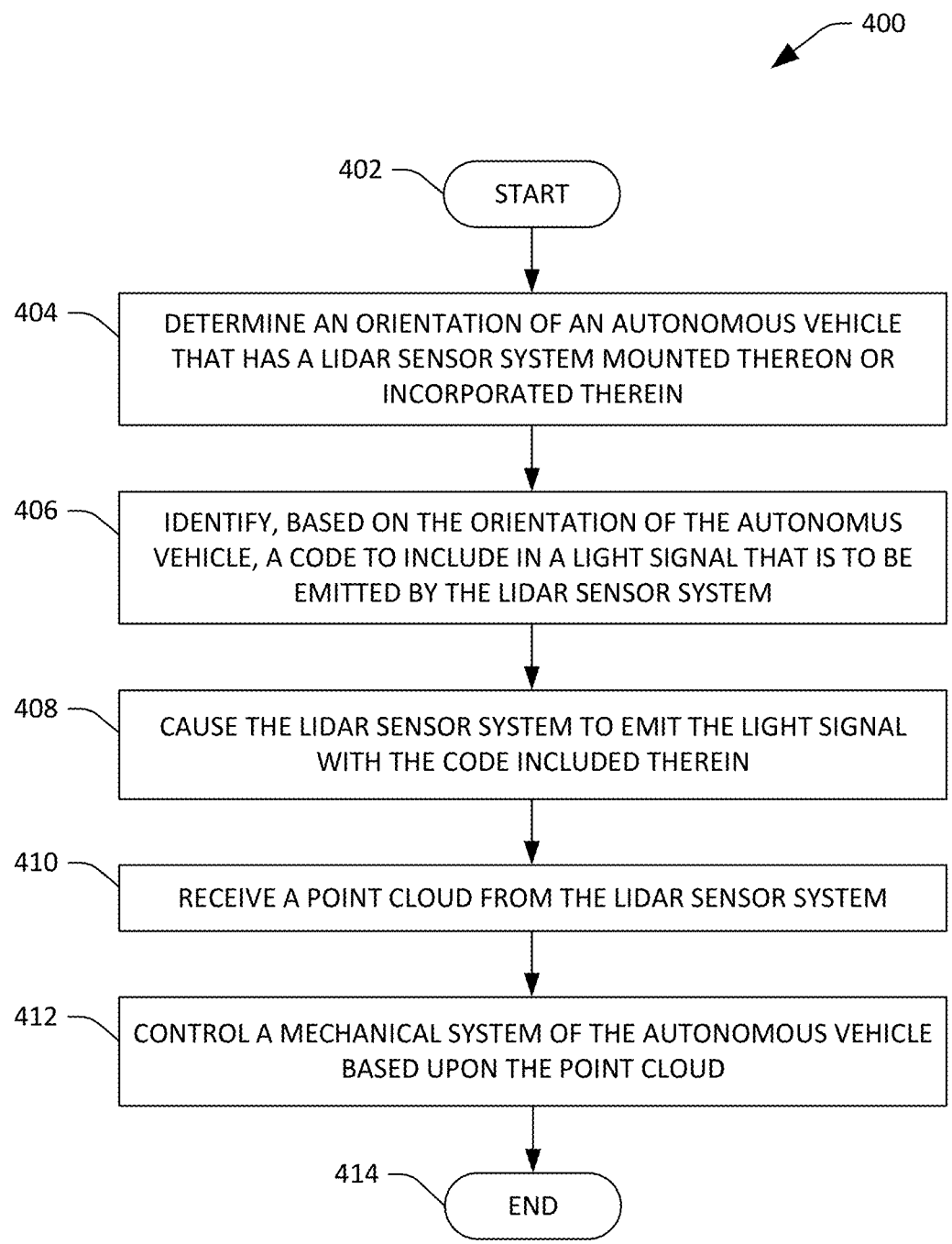
FIG. 4 is a flow diagram illustrating an exemplary methodology for controlling a lidar sensor system.
Figure 5:
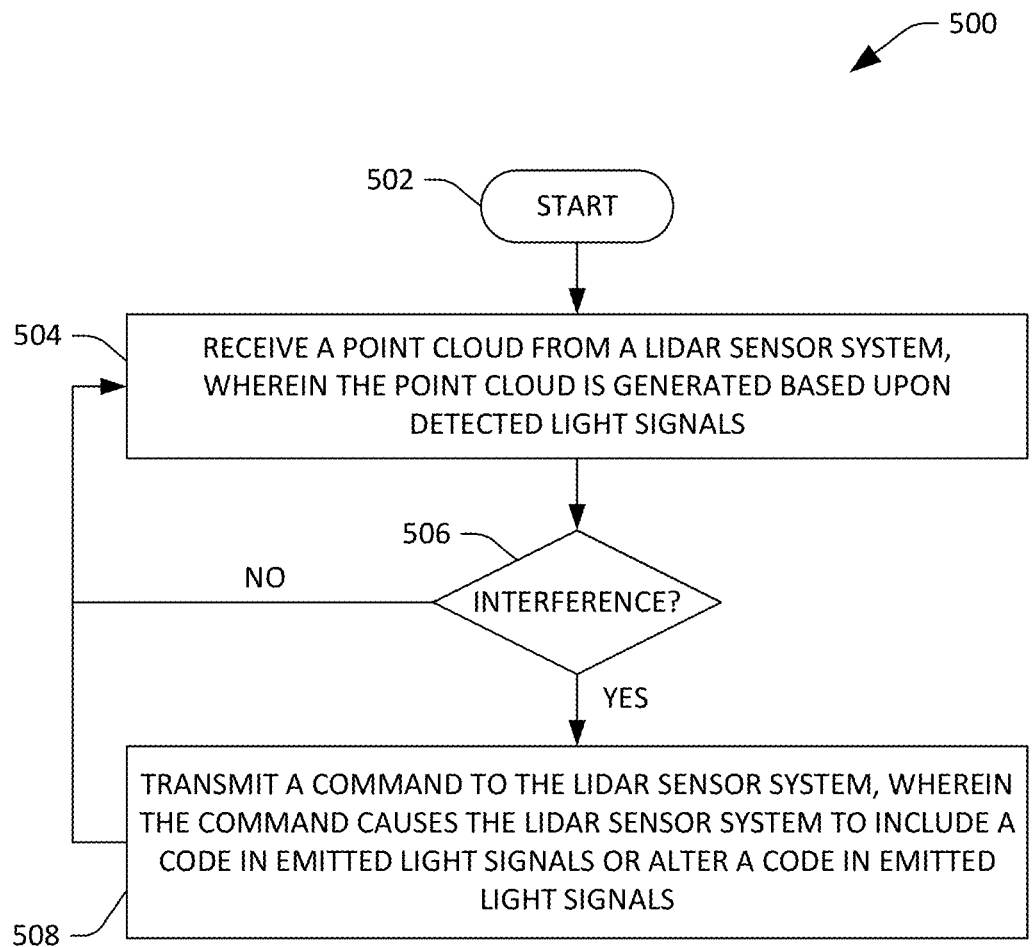
FIG. 5 is a flow diagram illustrating another exemplary methodology for controlling a lidar sensor system.
Figure 6:
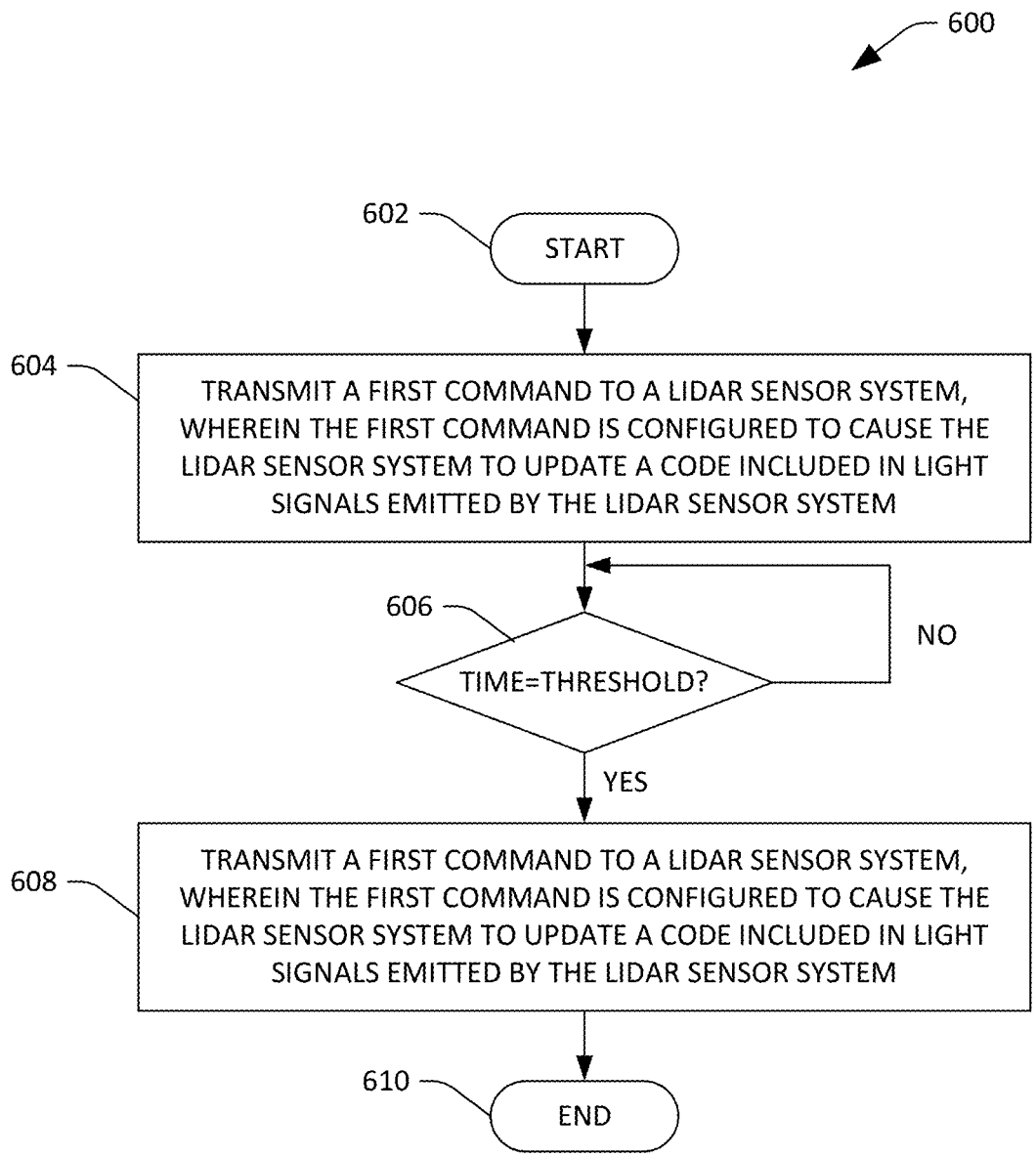
FIG. 6 is a flow diagram illustrating yet another exemplary methodology for controlling a lidar sensor system.

FIGS. 4-6 illustrate exemplary methodologies relating to mitigating interference with respect to lidar sensor systems. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring now to FIG. 4, an exemplary methodology 400 for preemptively mitigating interference with respect to a lidar sensor system is illustrated. The methodology 400, in an example, is performed by the computing system 110 of the first autonomous vehicle 102. The methodology 400 starts at 402, and at 404 an orientation of an autonomous vehicle that has the lidar sensor system mounted thereon or incorporated therein is determined. The determination may be based on a sensor signal from a sensor system of the autonomous vehicle. At 406, a code that is to be included in a light signal to be emitted by the lidar sensor system is identified based on the orientation of autonomous vehicle. As described previously, the code is employed to disambiguate a source of the lidar sensor system (e.g., identify the lidar sensor system as the source of the light signal). At 408, the lidar sensor system is caused to emit a light signal that includes the code. For example, the computing system may transmit a command to the lidar sensor system to generate a light signal that includes the code. At 410, subsequent to causing the lidar sensor system to emit the light signal with the code, a point cloud generated by the lidar sensor system is received, wherein the point cloud is generated based upon the light signal emitted by the lidar sensor system. At 412, a mechanical system of the autonomous vehicle is controlled based upon the point cloud. The methodology 400 completes at 414.

Referring now to FIG. 5, an exemplary methodology 500 for causing a lidar sensor system to update a code included in light signals emitted thereby is illustrated. The methodology 500, in an example, can be performed by the computing system 110 of the first autonomous vehicle 102. The methodology 500 starts at 502, and at 504 a point cloud is received from a lidar sensor system, wherein the point cloud is generated by the lidar sensor system based upon detected light signals. At 506, a determination is made, based upon the point cloud, whether the point cloud was generated based upon interference (e.g., the lidar sensor system detecting a light signal not emitted by the lidar sensor system). When it is determined at 506 that the point cloud was not generated based upon interference, the methodology 500 returns to 504. When it is determined at 506 that the point cloud was generated based upon interference, at 508 a command is transmitted to the lidar sensor system, wherein the command is configured to cause the lidar sensor system to include a code in light signals emitted thereby or update a code in light signals emitted thereby from a first code to a second code. The lidar system, in response to receiving the command, includes the code in the light signals or includes the second code in the light signals. The methodology 500 then returns to act 504.

Referring now to FIG. 6, an exemplary methodology 600 that facilitates mitigating interference at a lidar sensor system is illustrated. The methodology 600 is performed, for example, by the computing system 110 of the first autonomous vehicle 102. The methodology 600 starts at 602, and at 604 a first command is transmitted to the lidar sensor system, wherein the first command is configured to cause the lidar sensor system to update a code included in light signals emitted by the lidar sensor system. Therefore, prior to receiving the command, the lidar sensor system includes a first code in light signals emitted by the lidar sensor system, while after receiving the command, the lidar sensor system includes a second code in light signals emitted by the lidar sensor system.

At 606, a comparison is made between an amount of time that has lapsed since the first command was transmitted and a threshold amount of time. When the amount of time that has lapsed since the first command was transmitted reaches the threshold, the methodology 600 proceeds to 608, where a second command is transmitted to the lidar sensor system. The second command is configured to again cause the lidar sensor system to update the code included in light signals emitted by the lidar sensor system. Thus, as noted previously, after the first command is transmitted but prior to the second command being transmitted, the lidar sensor system can include the second code in light signals emitted by the lidar sensor system. After the second command is transmitted to the lidar sensor system, the lidar sensor system includes a third code in light signals emitted by the lidar sensor system. The methodology 600 completes at 612.

Figure 7:
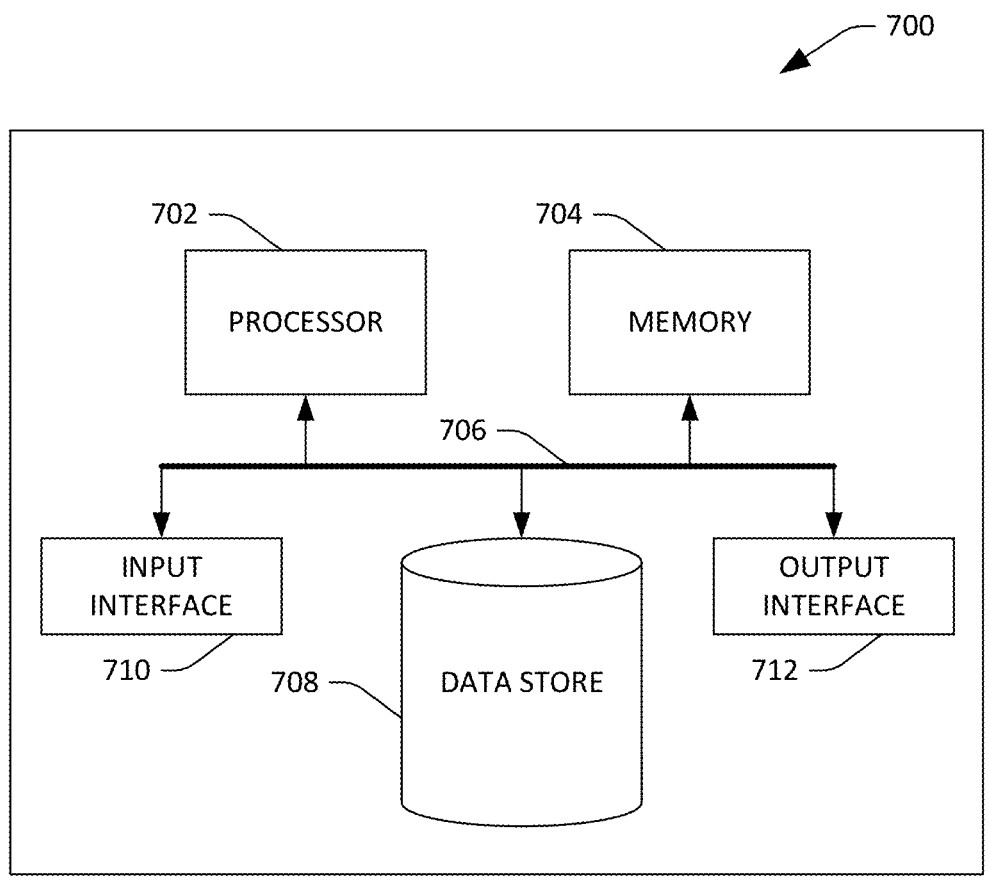
FIG. 7 illustrates an exemplary computing system.

Referring now to FIG. 7, a high-level illustration of an exemplary computing device 700 that can be used in accordance with the systems and methodologies disclosed herein is illustrated. For instance, the computing device 700 may be or include the computing system 110. The computing device 700 includes at least one processor 702 that executes instructions that are stored in a memory 704. The instructions may be, for instance, instructions for implementing functionality described as being carried out by one or more modules discussed above or instructions for implementing one or more of the methods described above. The processor 702 may access the memory 704 by way of a system bus 706. In addition to storing executable instructions, the memory 704 may also store information related to geospatial positions, interference, codes, orientations, and the like.

The computing device 700 additionally includes a data store 708 that is accessible by the processor 702 by way of the system bus 706. The data store 708 may include executable instructions, codes, and the like. The computing device 700 also includes an input interface 710 that allows external devices to communicate with the computing device 700. For instance, the input interface 710 may be used to receive instructions from an external computer device, from a user, etc. The computing device 700 also includes an output interface 712 that interfaces the computing device 700 with one or more external devices. For example, the computing device 700 may transmit command signals to lidar sensor systems, mechanical systems, etc. by way of the output interface 712.

Additionally, while illustrated as a single system, it is to be understood that the computing device 700 may be a distributed system. Thus, for instance, several devices may be in communication by way of a network connection and may collectively perform tasks described as being performed by the computing device 700.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a. transitional word in a claim.

What is claimed is:

1. An autonomous vehicle, comprising:
   a lidar sensor system that comprises a light emitter;
   a computing system in communication with the lidar sensor system, wherein the computing system comprises:
      a processor; and
      memory that stores instructions that, when executed by the processor, cause the processor to perform acts comprising:
         detecting interference based upon a point cloud, wherein detecting the interference comprises identifying that a point in the point cloud is based upon light signals emitted by a light source other than the lidar sensor system, and wherein a parameter is an identification of interference;
         based upon the parameter, determining that a code included in light signals emitted by the light emitter is to be updated; and
         responsive to determining that the code is to be updated, transmitting a command signal to the lidar sensor system, wherein the lidar system, in response to receipt of the command signal, causes the light emitter to transition from emitting light signals with a first code therein to emitting light signals with a second code therein, wherein the first code is different from the second code, and further wherein the computing system transmits the command signal to facilitate avoidance of interference with respect to the light signals emitted by the light source other than the lidar sensor system.

2. The autonomous vehicle of claim 1, wherein the first code is a first sequence of pulses and the second code is a second sequence of pulses.

3. The autonomous vehicle of claim 1, wherein the parameter is an orientation of the autonomous vehicle, and further wherein determining that the code included in the light signals emitted by the light emitter is to be updated comprises:
   determining that the orientation of the autonomous vehicle has altered from a first orientation to a second orientation.

4. The autonomous vehicle of claim 1, wherein the parameter is a geospatial position of the autonomous vehicle, the acts further comprising:
   receiving a signal that indicates that a second autonomous vehicle is in geographic proximity to the autonomous vehicle, wherein that the code is to be updated is determined based upon the signal.

5. The autonomous vehicle of claim 4, wherein the signal further comprises a code identifier that identifies a code included in light signals emitted by a second lidar sensor system of the second autonomous vehicle, and wherein determining that the code included in the light signals emitted by the light emitter is to be updated comprises:
   based upon the code identifier, determining that the code included in the light signals emitted by the second lidar sensor system is the first code.

6. The autonomous vehicle of claim 1, the acts further comprising:
   receiving the point cloud generated by the lidar sensor system, wherein the point cloud is generated based upon the light signals emitted by the lidar sensor system that include the first code.

7. The autonomous vehicle of claim 1, wherein the parameter is time, and further wherein determining that the code included in the light signals emitted by the light emitter is to be updated comprises:
   performing a comparison between a time when the code included in the light signals was last updated and a threshold, wherein that the code is determined to be updated is based upon the comparison.

8. The autonomous vehicle of claim 1, wherein the command signal is configured to cause the lidar sensor system to include a first code in light signals emitted in a first direction and to include a second code in light signals emitted in a second direction that is different from the first direction.

9. The autonomous vehicle of claim 1, wherein detecting the interference based upon the point cloud comprises performing a comparison between the point in the point cloud and a second point in the point cloud that is adjacent the point, wherein interference is detected based upon the comparison.

10. The autonomous vehicle of claim 1, wherein detecting the interference based upon the point cloud comprises performing a comparison between the point in the point cloud and a corresponding point in a second point cloud that was previously generated by the lidar sensor system, wherein the interference is detected based upon the comparison.

11. A method performed by a computer processor, the method comprising:
- receiving a point cloud generated by a lidar sensor system, wherein the point cloud is generated based upon light signals emitted by the lidar sensor system that include a first code;
- detecting interference based upon the point cloud, wherein the detecting the interference comprises identifying that a point in the point cloud is based upon a light signal emitted by a light source other than the lidar sensor system, and wherein a parameter is an identification of interference;
- determining that a code included in the light signals emitted by the lidar sensor system is to be updated, wherein the lidar sensor system is mounted on or incorporated in an autonomous vehicle; and
- based upon determining that the code is to be updated, transmitting a command signal to the lidar sensor system, wherein the command signal is configured to cause the lidar sensor system to update the code included in the light signals emitted by the lidar sensor system such that the lidar sensor system transitions from emitting light signals with a first code to emitting light signals with a second code that is different from the first code.

12. The method of claim 11, wherein the lidar sensor system is a spinning lidar sensor system.

13. The method of claim 11, wherein the computer processor is comprised by a computing system that is on board the autonomous vehicle.

14. The method of claim 11, wherein the computer processor is comprised by a computing system that is remote from the autonomous vehicle.

15. The method of claim 11, wherein the computer processor is comprised by the lidar sensor system.

16. The method of claim 11, further comprising:
- based upon a sensor signal output by a sensor of the autonomous vehicle, determining that a direction of travel of the autonomous vehicle has altered from a first direction to a second direction, wherein that the code is to be updated is determined based upon the direction of travel of the autonomous vehicle altering from the first direction of travel to the second direction of travel.

17. The method of claim 11, further comprising:
receiving an indication from a computing system that:
- a second autonomous vehicle is in geographic proximity to the autonomous vehicle; and
- a second lidar sensor system of the second autonomous vehicle is emitting light signals with the first code included therein, wherein that the code is to be updated is determined based upon the indication.

18. The method of claim 11, wherein the command signal is configured to cause a first light emitter of the lidar sensor system to emit a first light signal with a first code therein, and further wherein the command signal is configured to cause a second light emitter of the lidar sensor system to emit a second light signal with a second code therein.

19. An autonomous vehicle comprising:
a processor; and
memory that stores instructions that, when executed by the processor, cause the processor to perform acts comprising:
- receiving a point cloud generated by a lidar sensor system, wherein the point cloud is generated based upon light signals emitted by the lidar sensor system that include a first code, and wherein the lidar sensor system is mounted on or incorporated in the autonomous vehicle;
- detecting interference based upon the point cloud, wherein the detecting the interference comprises identifying that a point in the point cloud is based upon a light signal emitted by a light source other than the lidar sensor system, and wherein a parameter is an identification of interference;
- determining that a code included in the light signals emitted by the lidar sensor system is to be updated; and
- based upon determining that the code is to be updated, transmitting a command signal to the lidar sensor system, wherein the command signal is configured to cause the lidar sensor system to update the code included in the light signals emitted by the lidar sensor system such that the lidar sensor system transitions from emitting light signals with a first code to emitting light signals with a second code that is different from the first code.

20. The autonomous vehicle of claim 19, the acts further comprising:
- receiving an updated point cloud generated by the lidar sensor system, wherein the updated point cloud is generated based upon the light signals with the second code emitted by the lidar sensor system; and
- controlling a mechanical system of the autonomous vehicle based upon the updated point cloud.

* * * * *